United States Patent
Hwang et al.

(10) Patent No.: US 11,358,369 B2
(45) Date of Patent: Jun. 14, 2022

(54) PLATING STEEL SHEET FOR HOT PRESS FORMING, FORMING MEMBER USING SAME, AND MANUFACTURING METHOD THEREFOR

(71) Applicant: POSCO, Pohang-si (KR)

(72) Inventors: Hyeon-Seok Hwang, Gwangyang-si (KR); Il-Jeong Park, Gwangyang-si (KR); Myung-Soo Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/957,950

(22) PCT Filed: Dec. 21, 2018

(86) PCT No.: PCT/KR2018/016546
§ 371 (c)(1),
(2) Date: Jun. 25, 2020

(87) PCT Pub. No.: WO2019/132461
PCT Pub. Date: Jul. 4, 2019

(65) Prior Publication Data
US 2021/0008837 A1    Jan. 14, 2021

(30) Foreign Application Priority Data
Dec. 26, 2017    (KR) .......................... 10-2017-0180338

(51) Int. Cl.
*B32B 15/10*    (2006.01)
*B32B 15/01*    (2006.01)
(Continued)

(52) U.S. Cl.
CPC ............ *B32B 15/012* (2013.01); *C22C 21/10* (2013.01); *C22C 38/02* (2013.01); *C22C 38/04* (2013.01);
(Continued)

(58) Field of Classification Search
None
See application file for complete search history.

(56) References Cited

U.S. PATENT DOCUMENTS 3,505,043 A    4/1970  Lee et al.
5,308,710 A *  5/1994  Takeda ................. C23C 28/021
                                                        428/653
(Continued)

FOREIGN PATENT DOCUMENTS

CA    3020663    11/2017
EP    2728032    5/2014
(Continued)

OTHER PUBLICATIONS

European Search Report—European Application No. 18895227.9 dated Sep. 7, 2020, citing CA 3020663, EP 2957648, EP 2728032, and EP 3085813.
(Continued)

*Primary Examiner* — Seth Dumbris
(74) *Attorney, Agent, or Firm* — Cantor Colburn LLP

(57) ABSTRACT

A plating steel sheet for hot press forming includes: a base steel sheet; an Al—Zn-based plating layer formed on at least one surface of the base steel sheet; and an Fe—Al-based surface alloy layer formed between the base steel sheet and the Al—Zn-based plating layer, wherein the Al—Zn-based plating layer can include 10-30 wt % of Zn, 1 wt % or less of Fe, and the balance of Al and impurities.

6 Claims, 2 Drawing Sheets

(a)

(b)

(51) Int. Cl.
    *C22C 21/10*     (2006.01)
    *C22C 38/02*     (2006.01)
    *C22C 38/04*     (2006.01)
    *C23C 2/12*     (2006.01)
    *C23C 2/28*     (2006.01)
    *C23C 2/40*     (2006.01)

(52) U.S. Cl.
    CPC .................. *C23C 2/12* (2013.01); *C23C 2/28* (2013.01); *C23C 2/40* (2013.01); *Y10T 428/12757* (2015.01)

(56) References Cited

U.S. PATENT DOCUMENTS

| | | | |
|---|---|---|---|
| 6,296,805 B1 | 10/2001 | Laurent et al. | |
| 2008/0075970 A1 | 3/2008 | Suzuki et al. | |
| 2009/0142616 A1* | 6/2009 | Fujii | C23C 2/06 428/653 |
| 2011/0274945 A1* | 11/2011 | Shimoda | C23C 2/26 428/653 |
| 2015/0132603 A1* | 5/2015 | Liu | C23C 2/40 428/653 |
| 2016/0047018 A1* | 2/2016 | Morimoto | C23C 2/02 428/653 |
| 2016/0222484 A1* | 8/2016 | Koyer | C21D 6/005 |
| 2017/0198374 A1 | 7/2017 | Allely et al. | |
| 2019/0160507 A1 | 5/2019 | Sengoku et al. | |

FOREIGN PATENT DOCUMENTS

| | | |
|---|---|---|
| EP | 2957648 | 12/2015 |
| EP | 3085813 | 10/2016 |
| JP | 2006022395 | 1/2006 |
| JP | 2012012649 | 1/2012 |
| JP | 2012112010 | 6/2012 |
| JP | 2014148715 | 8/2014 |
| JP | 2017524806 | 8/2017 |
| KR | 20080108163 | 12/2008 |
| KR | 20130002228 | 1/2013 |
| KR | 20150041167 | 4/2015 |
| KR | 20150073021 | 6/2015 |
| KR | 20150074882 | 7/2015 |
| WO | 2017017513 | 2/2017 |
| WO | 2017060763 | 4/2017 |
| WO | 2017195269 | 11/2017 |

OTHER PUBLICATIONS

International Search Report—PCT/KR2018/016546 dated Apr. 3, 2019.

* cited by examiner (a)

(b)

PLATING STEEL SHEET FOR HOT PRESS FORMING, FORMING MEMBER USING SAME, AND MANUFACTURING METHOD THEREFOR

TECHNICAL FIELD

The present disclosure relates to a plated steel sheet for hot-press forming, a forming member using the plated steel sheet, a method for manufacturing the plated steel sheet, and a method for manufacturing the forming member. More specifically, the present disclosure is directed to a plated steel sheet for hot-press forming effectively suppressing the occurrence of liquid metal embrittlement and microcracking, a forming member using the plated steel sheet, and a method for manufacturing the plated steel sheet and a method for manufacturing the forming member.

BACKGROUND ART

As demand for safety and fuel efficiency has recently been increased, the application of high-strength steel for lightening a vehicle is increasing. High-strength steel may secure high-strength characteristics with regard to weight, but fracturing of a steel material occurs during processing, or springback occurs. Therefore, it may be difficult to form a product having a complex and precise shape. To address such issues resulting from high-strength steel, the application of hot-press forming continues to expand.

In hot-press forming, a steel sheet heated to a temperature within a range of 800 to 900° C. is processed through press working, so that forming of a steel material may be easily performed. In addition, quenching is performed through a die, so that strength of a formed product may be effectively secured. However, since a steel sheet may be heated to a high temperature to perform hot-press forming, phenomena such as corrosion and decarburization may occur on a surface of the steel sheet to deteriorate surface quality of the formed product. To prevent the deterioration of the surface quality of the formed product, use of a plated steel sheet having a zinc-based or an aluminum-based plating layer tends to be increased during hot-press forming.

Patent Document 1 proposes a technology for partially suppressing scale and preventing decarburization. According to the technology proposed in Patent Document 1, aluminum-based plating is performed on a surface of a steel sheet to form an aluminum passive film on even a component formed after hot working. However, in the case of an aluminum-plated steel sheet, it is known that a scale removing process is necessarily required after forming because a surface of the steel sheet is oxidized, and corrosion resistance and coatability are deteriorated by remaining scale. Moreover, aluminum has significantly lower sacrificial corrosion protection for suppressing scale of base steel than zinc, and corrosion resistance is rapidly deteriorated when base steel is exposed to an external environment.

Patent Document 2 proposes a hot-dip galvanized steel sheet as a steel sheet for hot-press working securing corrosion resistance. When a steel sheet including a hot-dip galvanized layer is hot-press formed, an iron-zinc phase may be present on a surface of a formed product to secure excellent corrosion resistance characteristics. However, when a zinc-plated steel sheet is used during hot-press forming, liquid metal embrittlement (LME) may occur due to permeation of liquid-state zinc of a plating layer, heated to a melting point or higher during a high-temperature working process, into base steel and microcracking having a size of several tens of micrometers may occur due to diffusion of solid-state zinc into a grain boundary of the base steel. Since a crack formed during forming is closely related to fatigue fracturing, automobile manufacturers strictly manage the quality of steel sheets for hot-press working. For example, automobile manufacturers do not permit the occurrence of LME in a steel material for hot-press working and strictly limit an allowable size of microcracking.

(Patent Document 1) U.S. Patent Registration No. 6296805 (Oct. 2, 2001)

(Patent Document 2) Japanese Laid-Open Patent Publication No. 2006-022395 (Jan. 26, 2006)

DISCLOSURE

Technical Problem

An aspect of the present disclosure is to provide a plated steel sheet for hot-press forming, effectively suppressing the occurrence of liquid metal embrittlement and microcracking, a forming member using the plated steel sheet, and a method for manufacturing the plated steel sheet and a method for manufacturing the forming member.

On the other hand, the objective of the present disclosure is not limited to the above description. The objective of the present disclosure maybe understood from the content of the present specification. Those skilled in the art have no difficulty in understanding additional objectives of the present disclosure.

Technical Solution

According to an aspect of the present disclosure, a plated steel sheet for hot press forming includes: a base steel sheet; an Al—Zn-based plating layer formed on at least one surface of the base steel sheet; and an Fe—Al-based interfacial alloy layer formed between the base steel sheet and the Al—Zn-based plating layer. The Al—Zn-based plating layer includes, by weight percentage (wt %), 10 to 30% of Zn, 1% or less of Fe, and a balance of aluminum (Al) and impurities.

The Fe—Al-based interfacial alloy layer may include, by wt %, 30 to 60% of aluminum (Al), 30 to 60% of iron (Fe), and 20% or less of silicon (Si), and other impurities.

The Al—Zn-based plating layer may further include, by wt %, 0.05 to 10% of at least one selected from the group consisting of beryllium (Be), titanium (Ti), and manganese (Mn).

The Al—Zn-based plating layer may, by wt %, 2% or less of magnesium (Mg).

A sum of thicknesses of the Al—Zn-based plating layer and the Fe—Al-based interfacial alloy layer may 5 to 40 μm.

A thickness of the Fe—Al-based interfacial alloy layer may 5 to 35% of a sum of thicknesses of the Al—Zn-based plating layer and the Fe—Al-based interfacial alloy layer.

A hot-process forming member according to an aspect of the present disclosure may be manufactured by hot-press forming the plated steel sheet.

A method for manufacturing a plated steel sheet for hot-press forming includes: preparing a base steel sheet; dipping the base steel sheet into a plating solution comprising, by weight percentage (wt %), 10 to 30% of zinc (Zn), 5 to 15% of silicon (Si), and a balance of aluminum (Al) and other impurities; and cooling the steel sheet, taken out of the plating solution, at a temperature within a range of 350° C. to manufacture a plated steel sheet for hot-press forming. The plated steel sheet for hot-press forming comprises an Al—Zn-based plating layer, formed on at least one surface of the base steel sheet, and an Fe—Al-based interfacial alloy layer formed between the base steel sheet and the Al—Zn-based plating layer.

The Fe—Al-based interfacial alloy layer may be formed such that a thickness of the Fe—Al-based interfacial alloy layer is 5 to 35% of a sum of thicknesses of the Al—Zn-based plating layer and the Fe—Al-based interfacial alloy layer.

The plating solution may further include, by wt %, 0.05 to 10% of at least one selected from the group consisting of beryllium (Be), titanium (Ti), and manganese (Mn).

The plating solution may include, by wt %, 2% or less of magnesium (Mg).

A method for manufacturing a hot-press forming member according to an aspect of the present disclosure includes: heating a plated steel sheet, manufactured by the method, to a temperature within a range of an Ac3 transformation point or higher; hot-press forming the heated plated steel sheet at the temperature; and cooling the hot-press formed plated steel sheet.

Advantageous Effects

A plated steel sheet according to an aspect of the present disclosure and a method for manufacturing the same may provide a plated steel sheet for hot-press forming, effectively suppressing the occurrence of liquid metal embrittlement and microcracking, and a method for manufacturing the same.

Therefore, a forming member according to an aspect of the present disclosure and a method for manufacturing the same may provide a hot-press forming member, effectively securing corrosion resistance and durability, and a method for manufacturing the same.

BEST MODE FOR INVENTION

The present disclosure relates to a steel material having excellent hydrogen-induced cracking resistance and a method for preparing the same. Examples of the present disclosure may be modified in various forms, and the scope of the present disclosure should not be construed as being limited to these examples set forth herein. The examples are provided to explain the present disclosure so that the present disclosure will be thorough and complete, and will fully convey the scope of the present disclosure to those skilled in the art.

A plated steel sheet according to an aspect of the present disclosure may include a base steel sheet and a plating layer formed on at least one surface of the base steel sheet. The plating layer of the plated steel sheet according to an aspect of the present disclosure may include an Fe—Al-based interfacial alloy layer, adjacent to the base steel sheet, and an Al—Zn-based plating layer being in contact with the Fe—Al-based interfacial alloy layer.

A zinc-plated steel sheet has better corrosion resistance than an aluminum-plated steel sheet. However, when zinc (Zn) included in a plating layer is in direct contact with a base steel sheet, liquid metal embrittlement (LME) and microcracking may occur. Therefore, the inventors have invented the present invention based on repeated research into a plating layer and the knowledge that a Zn component is included in a plating layer to secure corrosion resistance, and the Zn component included in the plating layer is prevented from being in direct contact with a base steel sheet to significantly suppress occurrence of liquid metal embrittlement and microcracking.

Figure 1:
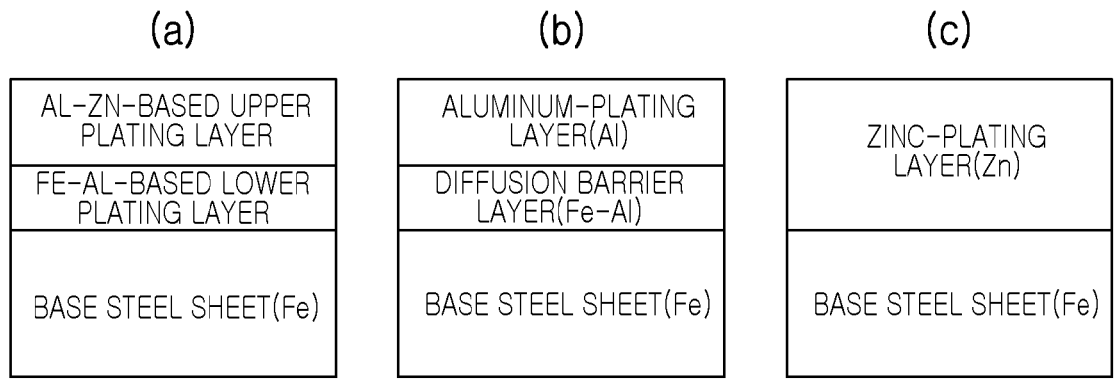
FIG. 1 is schematic diagrams for comparatively illustrating cross sections of a plated steel sheet for hot-process forming according to an aspect of the present disclosure, a zinc-plated steel sheet, and an aluminum-plated steel sheet.
Figure 2:
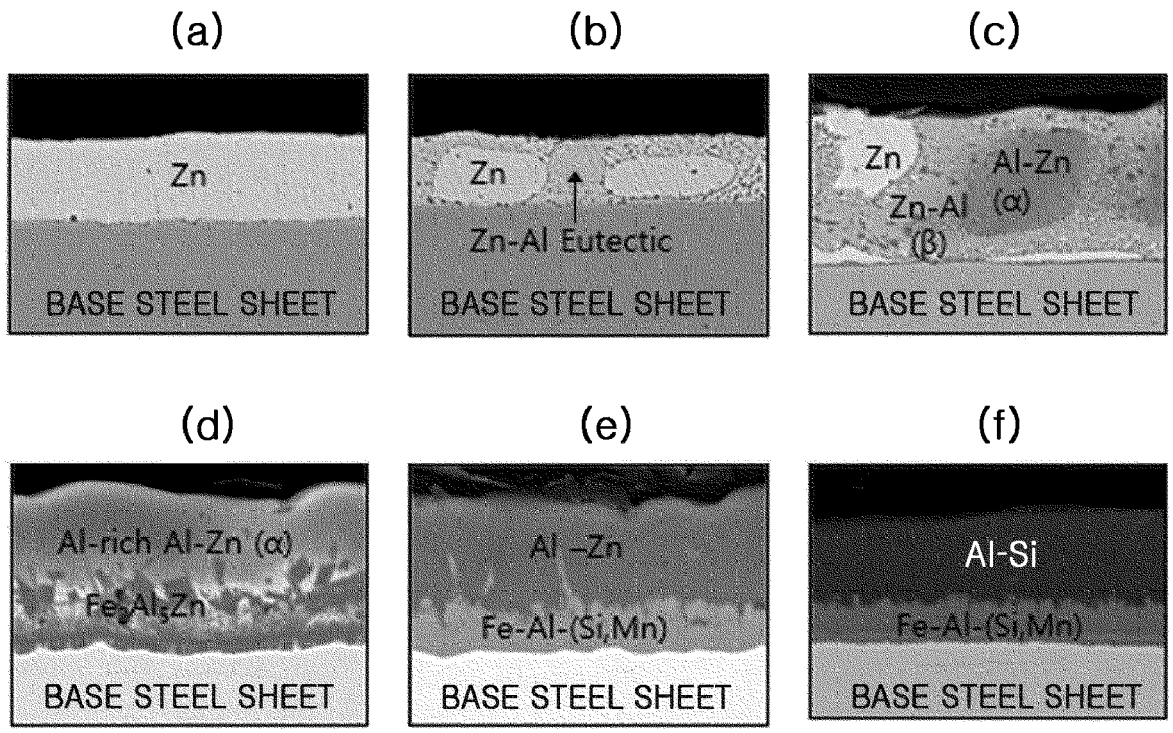
FIG. 2 is images in which cross sections of plated steel sheets, respectively manufactured by plating baths, are observed using an electron scanning microscope.

FIGS. 1A to 1C are schematic diagrams for comparatively illustrating cross sections of a plated steel sheet for hot-process forming according to an aspect of the present disclosure, a zinc-plated steel sheet, and an aluminum-plated steel sheet.

As illustrated in FIG. 1A, a plated steel sheet for hot-press forming according to an aspect of the present invention may include base steel and a plating layer on one side of the base steel. The plating layer may be divided into an Al—Zn-based plating layer and an Fe—Al-based interfacial alloy layer formed between the Al—Zn-based plating layer and a base steel sheet. For ease of description, the Al—Zn-based plating layer will be referred to as an Al—Zn-based upper layer, and the Fe—Al-based interfacial alloy layer will be referred to as an Fe—Al-based lower plating layer.

The Fe—Al-based lower plating layer is disposed adjacent to the base steel sheet, and the Al—Zn-based upper plating layer may be formed adjacent to the Fe—Al-based lower plating layer. For example, since the Fe—Al-based lower plating layer is provided between the base steel plate and the Al—Zn-based upper plating layer, a Zn component included in the Al—Zn-based upper plating layer may be significantly prevented from being in direct contact with the base steel plate.

On the other hand, FIG. 1B is a schematic diagram illustrating a cross section of a common aluminum-plated steel sheet, and FIG. 1C is a schematic diagram illustrating a cross section of a common zinc-plated steel sheet.

As illustrated in FIG. 1B, the common aluminum-plated steel sheet includes an aluminum-plating layer on a base steel sheet, and the aluminum-plating layer includes a diffusion barrier layer (Fe—Al) and an aluminum-plating layer (Al). Therefore, the aluminum-plated steel sheet may fundamentally prevent the Zn component from being in direct contact with the base steel sheet. However, in the case of a hot-press forming member provided by hot-press forming an aluminum-plated steel sheet, an aluminum oxide formed in a high-temperature environment remains on a surface of the aluminum-plating layer, and thus, weldability necessary for a vehicle body member may not be secured. In addition, Al having no sacrificial corrosion protection property, such as Zn, may not provide a sufficient level of corrosion resistance required for a vehicle member.

As illustrated in FIG. 1C, since the common zinc-plated steel sheet includes a zinc-plating layer (Zn), a Zn component is in direct contact with a base steel sheet. Therefore, in the case of a hot-press forming member provided by hot-press forming a galvanized steel sheet, liquid metal embrittlement and microcracking may occur.

Accordingly, the plating layer included in the plated steel sheet for hot-press forming according to an aspect of the present disclosure includes an Fe—Al-based lower plating layer, provided adjacent to the base steel plate, and an Al—Zn-based upper provided adjacent to the Fe—Al-based lower plating layer, which may effectively prevent the base steel sheet and the Zn component from being in direct contact with each other. Thus, liquid metal embrittlement and microcracking may be effectively prevented from occurring after hot-press forming. In addition, since Zn component is included in the plating layer, corrosion resistance of the plated steel sheet may be effectively secured by sacrificial corrosion protection.

In addition, the steel sheet of the present disclosure is a base steel sheet used to manufacture a plated steel sheet for hot-press forming, and component contents and a manufacturing method may not be necessarily limited.

Hereinafter, a plating layer according to an aspect of the present disclosure will be described in more detail.

A plating layer, included in a plated steel sheet for hot-process forming according to an aspect of the present disclosure may include, by weight percentage (wt %), 10 to 30% of zinc (Zn), 1% or less of iron (Fe), and a balance of aluminum (Al) and unavoidable impurities.

The present inventors conducted experiments on an effect of a content ratio of Al and Zn in a plating bath on a plating layer and reached the following results. A composition of each plating bath and plating conditions are listed in Table 1, and FIGS. 2A to 2F are images in which cross sections of plated steel sheets, respectively manufactured by plating baths, are observed using an electron scanning microscope.

TABLE 1

| Plating Bath No. | Composition of Plating Bath (wt %) | | | Temperature of Plating Bath (° C.) | Contact between Zinc and Base Steel |
|---|---|---|---|---|---|
| | Al | Zn | Si | | |
| 1 | 0.2 | 99.2 | — | 460 | ○ |
| 2 | 1 | 98.8 | 0.2 | 460 | ○ |
| 3 | 5 | 93.5 | 1.5 | 460 | ○ |
| 4 | 25 | 73.5 | 1.5 | 550 | ○ |
| 5 | 45 | 47 | 7 | 620 | ○ |
| 6 | 56 | 30 | 7 | 640 | x |
| 7 | 92 | — | 7 | 660 | x |

FIGS. 2A to 2F are images in which cross sections of plated steel sheets manufactured by plating baths 2 to 7 are observed using a scanning electron microscope. As illustrated in FIGS. 2A to 2F, it is confirmed that in the case of the plating baths 2 to 5, an area in which a Zn component is in contact with a base steel sheet is reduced as the content of the Zn component is reduced, but the Zn component is still present at an interface with the base steel sheet to be in direct contact with the base steel sheet.

On the other hand, it is confirmed that in the case of the plating baths 6 and 7, a Zn component is not in direct contact with a base steel sheet. For example, in the case of the plating bath 6 in which among components of a plating bath, Zn is included in an amount of about 30%, an Fe—Al—(Si,Mn) layer is formed on an interface side with the base steel sheet, an Al—Zn layer is formed on the Fe—Al—(Si,Mn) layer, and the Al—Zn layer and the base steel sheet are physically and chemically spaced apart from each other by the Fe—Al—(Si,Mn) layer. Therefore, it is confirmed that the base steel sheet and the Zn component may be effectively prevented from being in direct contact with each other. As a result, the content of the plating layer provided on the plated steel sheet for hot-press forming according to an example embodiment may be limited to 30% or less.

In addition, since Zn is an element included in the plating layer for a sacrificial corrosion protection effect, the content of Zn included in the plating layer may be limited to 10% or more to secure sufficient corrosion resistance.

The plating layer according to an aspect of the present disclosure may further include 5 to 15% of silicon (Si).

Silicon (Si) is an element added to control the alloying of Al included in the plating layer and Fe included in the base steel sheet. For example, a thickness of the Fe—Al-based lower plating layer may be adjusted depending on the content of Si. In addition, Si may cause a melting point of a plating bath to be lowered, and thus, may lower a temperature of the plating bath to effectively suppress formation of ashes of the plating bath.

When the content of Si is excessively low, reactivity of Fe of the base steel sheet and Al of the plating bath may be increased to form a thick Fe—Al-based lower plating layer. In this case, the Fe—Al-based lower plating layer high strong brittleness may cause the plating layer to be separated during working of a material. Therefore, in the present disclosure, the content of Si included in the plating layer may be limited to 5% or more. Meanwhile, when the content of Si is excessively high, the Fe—Al-based lower plating layer is formed to have a significantly high thickness. Thus, the possibility that the Zn component of the Al—Zn-based upper plating layer is brought into contact with the steel sheet may be increased to lead to the high possibility of the occurrence of microcracking. Therefore, in the present disclosure, the content of Si included in the plating layer may be limited to 15% or less.

In the present disclosure, an Fe—Al-based lower plating layer and an Al—Zn-based upper plating layer are terms introduced to define a plating layer, which does not mean that the Fe—Al-based lower plating layer necessarily include Fe and Al components, and the Al—Zn-based upper plating layer necessarily includes Al and Zn components. However, the Fe—Al-based lower plating layer may include Fe and Al as main components and may further include impurities unavoidably added during formation of a plating layer, but may refer to a plating layer in which the content of Zn include in the Fe—Al-based lower plating layer is actively suppressed.

The Fe—Al-based lower plating layer may include, by weight percentage (wt %), 30 to 60% Al, 30 to 60% Fe, and 20% or less of Si and other impurities. In the present disclosure, the content of Zn included in the Fe—Al-based lower plating layer may be actively suppressed and, even when Zn is introduced into the Fe—Al-based lower plating layer, the content of Zn may be actively limited to 3% or less. An upper limit of the content of the Zn component included in the Fe—Al-based lower plating layer may be, in detail, 2% and, in more detail, 1%.

The Al—Zn-based upper plating layer may include 10 to 30% of Zn and 1% or less of Fe, by weight percentage (wt %) on the total of the plating layer. For example, since the Al—Zn-based upper plating layer includes most of the content of Zn included in the entire plating layer, the Zn component may be enriched on a surface side of the plating layer. Therefore, the corrosion resistance of the plated steel sheet may be effectively secured by the sacrificial corrosion protection of the Zn component. In addition, since Al has higher reactivity with Fe than Zn, most of Fe of the base steel sheet reacts with Al to form an Fe—Al-based lower plating layer, and the content of Fe introduced into the Al—Zn-based upper plating layer is insignificant low.

Therefore, the content of Fe included in the Al—Zn-based upper plating layer may be a level of 1 wt % or less on the total of the plating layer. As a result, the Al—Zn-based upper plating layer and the Fe—Al-based lower plating layer may be classified by the contents of Fe and Zn components.

Beryllium (Be) is an element having an effect of suppressing volatilization of Zn by forming a thin oxide film on a surface of the plating layer at a high temperature and having an effect of making the surface beautiful after hot-press forming. Manganese (Mn) may react with Al during solidification of the plating layer to forma fine crystallized material on the surface and may suppress adhesion between a die and the plating layer during a heat treatment for hot-press forming. Titanium (Ti) is an element contributing to heat treatment properties during hot-press forming. Therefore, the plating layer of the present disclosure may further include at least one selected from the group consisting of Be, Ti, and Mn in amount of 0.05 to 10%. In spite of the addition of such elements, the same effects as described above may be obtained.

In the plated steel sheet for hot-press forming according to an aspect of the present disclosure, the content of Mg included in the plating layer may be limited to 2% or less. For example, the content of Mg included in the plating layer may be actively suppressed, and may be limited to a level of 2% or less even when Mg is avoidably included.

Magnesium (Mg) may stabilize pH of a corrosion product during a corrosion process of the plating layer to delay a process of changing Simonkolleite phase into ZnO, and thus, may improve corrosion resistance. However, Mg does not react with Fe of the base steel sheet during hot-press forming, and may be enriched on the plating layer to be isolated by a region having a low melting point, and thus, may cause microcracking to occur. Therefore, the content of Mg included in the plating layer may be limited to 2% or less to suppress occurrence of microcracking.

However, even when Mg is somewhat included, most of Mg is distributed in the Al—Zn-based upper plating layer due to a difference in reactivity with Al, and the Mg component enriched on a surface layer portion of the plating layer may contribute to improvement of corrosion resistance of the plated steel sheet.

In addition, a thickness of the plating layer provided on the plated steel sheet for hot-press forming according to an example embodiment may be 5 to 40 μm, and an average thickness of the Fe—Al-based lower plating layer may be 5 to 35% of an average thickness of the entire plating layer.

Since the plated steel sheet for hot-press forming is a steel material mainly used for a vehicle body, sufficient corrosion resistance should be secured to address long-term corrosion. Therefore, the plating layer of the plated steel sheet provided for hot-press forming needs to have a thickness of 5 μm or more to secure corrosion resistance. On the other hand, when the thickness of the plating layer of the plated steel sheet provided for hot-press forming is greater than a certain level, Fe of the base steel sheet may be insufficiently diffused into the plating layer during hot-press forming, so that a region having a low melting point may be present in the plating layer to increase the possibility that liquid metal embrittlement occurs. Therefore, in the present disclosure, the thickness of the plating layer may be limited to 40 μm or less.

The Fe—Al-based lower plating layer of the present disclosure serves to prevent the Zn component in the plating layer from being in direct contact with the base steel sheet. To achieve such an effect, an average thickness of the Fe—Al-based lower plating layer may be is 5% or more of an average thickness of the entire plating layer. The Fe—Al-based lower plating layer is a hard alloy plating layer. For this reason, when Fe—Al-based lower plating layer is excessively included in the plating layer, there is possibility that the plating layer peels off. Therefore, the average thickness of the Fe—Al-based lower plating layer may be 35% or less of the average thickness of the entire plating layer.

Therefore, the plated steel sheet for hot-press forming according to an embodiment may include the Fe—Al-based lower plate layer, formed adjacent to the base steel sheet, to effectively prevent the Zn component from being in direct contact with the base steel sheet. In addition, the Al—Zn-based upper plating layer formed adjacent to the Fe—Al-based lower plating layer may include the Zn component to effectively secure corrosion resistance of the plated steel sheet due to sacrificial corrosion protection of the Zn component.

A hot-press forming member according to an aspect of the present disclosure may be manufactured by hot-press forming the above-described plated steel sheet for hot-press forming. The hot-press forming member of the present disclosure may suppress direct contact between a Zn component, included in a plating layer on a base steel sheet, and the base steel sheet to effectively prevent liquid metal embrittlement and microcracking from occurring and may effectively secure corrosion resistance of a hot-press forming member due to sacrificial corrosion protection of the Zn component included in the plating layer.

Hereinafter, a manufacturing method of the present disclosure will be described in more detail.

A method for manufacturing a plated steel sheet for hot-press forming according to an aspect of the present disclosure may include prepares a base steel sheet, dipping the base steel sheet into a plating solution, including Zn and Al, to form a plating layer, and cooling the steel sheet to a temperature within a range of 350° C. at a cooling rate of 15~25° C./sec to manufacture a plated steel sheet.

The plating solution of the present disclosure may include, by weight percentage (wt %), 10 to 30% of Zn, 5 to 15% of Si, and a balance of Al and other impurities. In addition, the plating solution of the present disclosure, by wt %, may further include 0.05 to 10% of at least one selected from the group consisting of Be, Ti, and Mn. In addition, the plating solution of the present disclosure may include, by wt %, 2% or less of Mg.

A composition and content of a plating solution of the present disclosure correspond to the above-described composition and content of the plating layer, so that descriptions of reasons for limitation of the composition and content of the plating solution are replaced with the above descriptions of the composition and content of the plating layer.

In the method of manufacturing a plated steel sheet for hot-press forming according to an aspect of the present disclosure, the plating layer may be formed by a known plating method and may be formed by, in detail, a hot-dip galvanizing method.

When the plating layer of the present disclosure is formed, Al in the plating solution and Fe of the base steel sheet may form an Fe—Al alloy structure by interdiffusion in an early stage of formation of the plating layer, and then an Al—Zn-based upper plating layer may be formed because Al has higher reactivity with Fe than Zn. In this case, the Fe—Al-based lower plating layer may be formed to have an average thickness at a level of 5 to 35% of an average thickness of the entire plating layer, and the entire plating layer may be formed to have a thickness of 5 to 40 μm. Composition contents of the Fe—Al-based lower plating layer and the Al—Zn-based upper plating layer correspond to the composition contents of the Fe—Al-based lower plating layer and the Al—Zn-based upper plating layer of the above-mentioned plated steel sheet. Therefore, the description of the composition contents of the Fe—Al-based lower plating layer and the Al—Zn-based upper plating layer of the present invention is replaced with the description of the composition contents of the Fe—Al-based lower plating layer and the Al—Zn-based upper plating layer of the above-mentioned plated steel sheet.

In the method for manufacturing a plated steel sheet for hot-press forming according to an aspect of the present disclosure, the Fe—Al-based lower plating layer and the Al—Zn-based upper plating layer are sequentially formed when the plating layer is formed. Therefore, a Zn component may be effectively prevented from being in direct contact with a base steel sheet, and corrosion resistance of the plated steel sheet may be effectively secured by the Zn component disposed on a surface layer portion of the plated steel sheet.

In addition, in the method for manufacturing a plated steel sheet for hot-press forming according to an aspect of the present disclosure, cooling may be performed after formation of a plating layer. Conditions of the cooling may be conventional conditions of cooling applied to hot-dip galvanization. More specifically, after an air-wiping operation is performed on the plated steel sheet taken out of the plating bath, the plated steel sheet may be cooled to a temperature within a range of 350° C. at a cooling rate of 15 to 25° C./sec.

A hot-press forming member according to an aspect of the present disclosure may be manufactured by heating a plated steel sheet, manufactured by the above-described method, to a temperature within a range of an Ac3 transformation point or higher to be hot-press formed and cooling the hot-press formed plated steel sheet.

In the method for manufacturing a hot-press forming member according to an aspect of the present disclosure, a hot-press forming member may be manufactured by a hot-press forming method commonly used in the art.

BEST MODE FOR INVENTION

Hereinafter, embodiments of the present disclosure will be described more specifically through examples. However, the examples are for clearly explaining the embodiments of the present disclosure and are not intended to limit the scope of the present invention.

EXAMPLE

A cold-rolled steel sheet for hot-press forming having a thickness of 1.5 mm was prepared as a base steel sheet. The base steel sheet was a cold-rolled steel sheet including, by weight percentage (wt %), 0.22% of carbon (C), 0.24% of silicon (Si), 1.56% of manganese (Mn), 0.0028% of boron (B), and a balance of iron (Fe) and other unavoidable impurities. The base steel sheet was heat-treated in an annealing furnace at a temperature of 800° C. in a nitrogen atmosphere, in which hydrogen is included in an amount of 5%, to reduce a surface of the base steel sheet. The heat-treated base steel sheet was dipped into plating baths, respectively prepared at an entry temperature of 660° C., to prepare plated steel sheet specimens. Compositions of the plating baths are listed in Table 2. After the steel sheet was dipped into the plating baths, a plating amount was constantly adjusted through an air knife, and then the steel sheet was cooled.

Each of the specimens was heated to a temperature of 900° C. and then maintained for 180 seconds. In a die equipped with a quenching facility, the heated specimens were worked in an omega shape to prepare hot-press forming member specimens. A plating layer of each of the hot-press forming member specimens was observed using a scanning electron microscope, and results thereof is listed in Table 2. In a 3.5% NaCl aqueous solution, a polarization test using a potentiostatic method was performed on each hot-press forming member, and sacrificial corrosion protection evaluation results resistance are listed in Table 2. In Table 2, a ratio of plating layers of Comparative Examples 6 to 8 refers to an Fe—Al diffusion barrier layer.

TABLE 2

| Plating Bath | | Composition of Plating Bath (wt %) | | | | Ratio of Fe—Al-based Lower Plating layer | Peeling of Plating layer | Contact between Zinc and Base Steel | LME | Microcracking | Sacrificial Corrosion Protection |
|---|---|---|---|---|---|---|---|---|---|---|---|
| No. | Classification | Al | Zn | Si | Mg | | | | | | |
| 1 | Specimen 1 | 59 | 37 | 4 | — | 0.09 | — | Contact | Occurred | occurred | Excellent |
| 2 | Specimen 2 | 70 | 27 | 3 | — | 0.04 | — | Contact | Occurred | occurred | Excellent |
| 3 | Specimen 3 | 63 | 30 | 7 | — | 0.32 | — | Non-contact | — | — | Excellent |
| 4 | Specimen 4 | 81 | 10 | 7 | 2 | 0.30 | — | Non-contact | — | — | Excellent |
| 5 | Specimen 5 | 73 | 20 | 7 | — | 0.21 | — | Non-contact | — | — | Excellent |
| 6 | Specimen 6 | 80 | 20 | — | — | 0.38 | Peeled | Non-contact | — | — | Excellent |
| 7 | Specimen 7 | 70 | 20 | 7 | 3 | 0.22 | — | Non-contact | — | occurred | Excellent |
| 8 | Specimen 8 | 88 | — | 7 | 5 | (0.25) | — | Non-contact | — | occurred | Poor |
| 9 | Specimen 9 | 90 | — | 9 | 1 | (0.29) | — | Non-contact | — | — | Poor |
| 10 | Specimen 10 | 87 | — | 9 | 4 | (0.18) | — | Non-contact | — | occurred | Poor |

In the case of specimens 3 to 5 satisfying the component of a plating bath of the present disclosure, it was confirmed that a base steel plate and a Zn component were not in contact with each other due to an Fe—Al-based lower plating layer, and corrosion resistance was excellent. From a result of analysis of components of the Al—Zn-based upper plating layer, it was also confirmed that each of the specimens 3 to 5 included less than 1% of Fe. On the other hand, in the case of specimens 1 and 2 and specimens 6 to 10, not satisfying the component of a plating bath of the present disclosure, it was confirmed that a steel plate and a Zn component were in contact with each other or corrosion resistance was poor.

Figure 3:
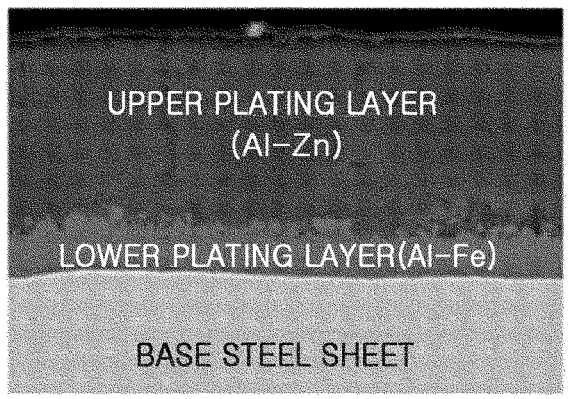
FIG. 3 is images in which cross sections of specimens 4 and 5 are observed using an electron scanning microscope.
Figure 3:
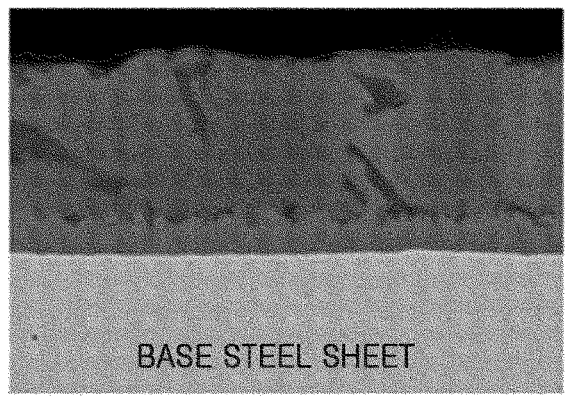

FIGS. 3A and 3B are images in which cross sections of specimens 4 and 5 are observed using an electron scanning microscope. As can seen from FIGS. 3A and 3B, an Fe—Al-based lower plating layer was formed between a base steel sheet and an Al—Zn-based upper plating layer, and an Fe—Al-based lower plating layer prevented the base steel sheet and the Al—Zn-based upper plating layer from being in contact with each other.

Figure 4:
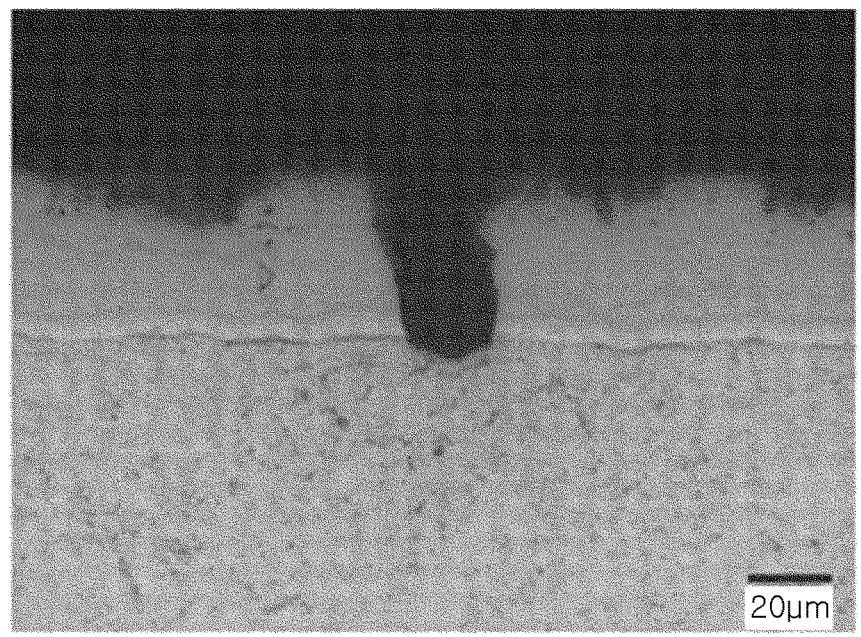
FIG. 4 is an image in which a cross section of a specimen 5 is observed using a scanning electron microscope after hot-press forming is performed on the specimen 5.

FIG. 4 is an image in which a cross section of a specimen 5 is observed using a scanning electron microscope after hot-press forming is performed on the specimen 5. As can be seen from FIG. 4, cracking did not occur in a base steel sheet due to an Fe—Al-based lower plating layer, and corrosion resistance was secured by an Al—Zn-based upper plating layer.

Therefore, a plated steel sheet according to an aspect of the present disclosure and a method for manufacturing the same may provide a plated steel sheet, capable of effectively suppressing occurrence of liquid metal embrittlement and microcracking during hot-press forming, and a method for manufacturing the same. In addition, a forming member according to an aspect of the present disclosure and a method for manufacturing the same may provide a hot-press forming member, capable of effectively securing corrosion resistance and durability, and a method for manufacturing the same.

While example embodiments have been shown and described above, the scope of the present disclosure is not limited thereto, and it will be apparent to those skilled in the art that modifications and variations could be made without departing from the scope of the present invention as defined by the appended claims.

The invention claimed is:

1. A plated steel sheet for hot press forming, the plated steel sheet comprising:
   a base steel sheet;
   an Al—Zn-based plating layer formed on at least one surface of the base steel sheet; and
   an Fe—Al-based interfacial alloy layer formed between the base steel sheet and the Al—Zn-based plating layer, and the Al—Zn-based plating layer is directly on the Fe—Al-based interfacial alloy layer,
   wherein the Al—Zn-based plating layer comprises, by weight percentage (wt %), 10 to 30% of Zn, 1% or less of Fe, and a balance of aluminum (Al) and impurities, and
   wherein the Fe—Al-based interfacial alloy layer comprises, by wt %, 30 to 60% of aluminum (Al), 30 to 60% of iron (Fe), 20% or less of silicon (Si), and impurities.

2. The plated steel sheet of claim 1, wherein the Al—Zn-based plating layer further comprises, by wt %, 0.05 to 10% of at least one selected from the group consisting of beryllium (Be), titanium (Ti), and manganese (Mn).

3. The plated steel sheet of claim 1, wherein the Al—Zn-based plating layer further comprises, by wt %, 2% or less of magnesium (Mg).

4. The plated steel sheet of claim 1, wherein a sum of thicknesses of the Al—Zn-based plating layer and the Fe—Al-based interfacial alloy layer is 5 to 40 μm.

5. The plated steel sheet of claim 1, wherein a thickness of the Fe—Al-based interfacial alloy layer is 5 to 35% of a sum of thicknesses of the Al—Zn-based plating layer and the Fe—Al-based interfacial alloy layer.

6. A hot-process forming member manufactured by hot-press forming a plated steel sheet of claim 1.

* * * * *